(12) United States Patent
Lonsberry et al.

(10) Patent No.: US 12,553,711 B2
(45) Date of Patent: Feb. 17, 2026

(54) REFLECTION REFUTING LASER SCANNER

(71) Applicant: Path Robotics, Inc., Columbus, OH (US)

(72) Inventors: Alexander James Lonsberry, Gahanna, OH (US); Andrew Gordon Lonsberry, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 302 days.

(21) Appl. No.: 18/494,497

(22) Filed: Oct. 25, 2023

(65) Prior Publication Data

US 2024/0133678 A1 Apr. 25, 2024
US 2024/0230319 A9 Jul. 11, 2024

Related U.S. Application Data

(63) Continuation of application No. 17/547,763, filed on Dec. 10, 2021, now Pat. No. 11,859,964, which is a
(Continued)

(51) Int. Cl.
*G01B 11/25* (2006.01)
(52) U.S. Cl.
CPC ...... *G01B 11/2513* (2013.01); *G01B 11/2518* (2013.01)
(58) Field of Classification Search
CPC .......................... G01B 11/2513; G01B 11/2518
(Continued)

(56) References Cited

U.S. PATENT DOCUMENTS 3,532,807 A 10/1970 Webb et al.
4,011,437 A 3/1977 Hohn
(Continued)

FOREIGN PATENT DOCUMENTS

| CA | 3098890 | 11/2019 |
| JP | H05126545 | 5/1993 |
| JP | 2000-193438 | 7/2000 |

OTHER PUBLICATIONS

International Application No. PCT/US2019/029717, filed Apr. 29, 2019, by Path Robotics, Inc.: International Search Report and Written Opinion, mailed Jul. 19, 2019, including Notification of Transmittal; 13 pages.
(Continued)

*Primary Examiner* — Allen H Nguyen
(74) *Attorney, Agent, or Firm* — IPkey PLLC

(57) ABSTRACT

Some embodiments described herein relate to optical systems and methods for determining the shape and/or size of objects that include projecting a pattern of light onto the object. The pattern of light can be configured such that first-order reflections can be distinguished from second- and/or higher-order reflections, which can be rejected. Thus, even in instances in which the pattern of light is reflected onto the object multiple times, the original, or first-order, reflection can be detected, distinguished, and/or used for laser triangulation. In some embodiments, a pattern of light that does not have reflection and/or rotational symmetry is projected onto the object, such that second-order and/or higher-order reflections can be distinguished from the first-order reflection.

20 Claims, 4 Drawing Sheets

Related U.S. Application Data continuation of application No. 16/778,649, filed on Jan. 31, 2020, now Pat. No. 11,209,264, which is a continuation of application No. 16/397,428, filed on Apr. 29, 2019, now Pat. No. 10,551,179.

(60) Provisional application No. 62/664,320, filed on Apr. 30, 2018.

(58) Field of Classification Search
USPC .................................................... 382/154
See application file for complete search history.

(56) References Cited

U.S. PATENT DOCUMENTS

| | | |
|---|---|---|
| 4,021,840 A | 5/1977 | Ellsworth et al. |
| 4,148,061 A | 4/1979 | Lemelson |
| 4,255,643 A | 3/1981 | Balfanz |
| 4,380,696 A | 4/1983 | Masaki |
| 4,412,121 A | 10/1983 | Kremers et al. |
| 4,482,968 A | 11/1984 | Inaba et al. |
| 4,492,847 A | 1/1985 | Masaki et al. |
| 4,495,588 A | 1/1985 | Nio et al. |
| 4,497,019 A | 1/1985 | Waber |
| 4,497,996 A | 2/1985 | Libby, Jr. et al. |
| 4,515,521 A | 5/1985 | Takeo et al. |
| 4,553,077 A | 11/1985 | Brantmark et al. |
| 4,555,613 A | 11/1985 | Shulman |
| 4,561,050 A | 12/1985 | Iguchi et al. |
| 4,567,348 A | 1/1986 | Smith et al. |
| 4,575,304 A | 3/1986 | Nakagawa et al. |
| 4,578,554 A | 3/1986 | Coulter |
| 4,580,229 A | 4/1986 | Koyama et al. |
| 4,587,396 A | 5/1986 | Rubin |
| 4,590,577 A | 5/1986 | Nio et al. |
| 4,593,173 A | 6/1986 | Bromley et al. |
| 4,595,989 A | 6/1986 | Yasukawa et al. |
| 4,613,942 A | 9/1986 | Chen |
| 4,616,121 A | 10/1986 | Clocksin et al. |
| 4,617,504 A | 10/1986 | Detriche |
| 4,642,752 A | 2/1987 | Debarbieri et al. |
| 4,652,803 A | 3/1987 | Kamejima et al. |
| 4,675,502 A | 6/1987 | Haefner et al. |
| 4,677,568 A | 6/1987 | Arbter |
| 4,685,862 A | 8/1987 | Nagai et al. |
| 4,724,301 A | 2/1988 | Shibata et al. |
| 4,725,965 A | 2/1988 | Keenan |
| 4,744,039 A | 5/1988 | Suzuki et al. |
| 4,745,857 A | 5/1988 | Putnam et al. |
| 4,804,860 A | 2/1989 | Ross et al. |
| 4,812,614 A | 3/1989 | Wang et al. |
| 4,833,383 A | 5/1989 | Skarr et al. |
| 4,833,624 A | 5/1989 | Kuwahara et al. |
| 4,837,487 A | 6/1989 | Kurakake et al. |
| 4,845,992 A | 7/1989 | Dean |
| 4,899,095 A | 2/1990 | Kishi et al. |
| 4,906,907 A | 3/1990 | Tsuchihashi et al. |
| 4,907,169 A | 3/1990 | Lovoi |
| 4,924,063 A | 5/1990 | Buchel et al. |
| 4,945,493 A | 7/1990 | Huang et al. |
| 4,969,108 A | 11/1990 | Webb et al. |
| 4,973,216 A | 11/1990 | Domm |
| 5,001,324 A | 3/1991 | Aiello et al. |
| 5,006,999 A | 4/1991 | Kuno et al. |
| 5,053,976 A | 10/1991 | Nose et al. |
| 5,083,073 A | 1/1992 | Kato |
| 5,096,353 A | 3/1992 | Tesh et al. |
| 5,154,717 A | 10/1992 | Matsen, III et al. |
| 5,159,745 A | 11/1992 | Kato |
| 5,219,264 A | 6/1993 | McClure et al. |
| 5,245,409 A | 9/1993 | Tobar |
| 5,288,991 A | 2/1994 | King et al. |
| 5,300,869 A | 4/1994 | Skaar et al. |
| 5,329,469 A | 7/1994 | Watanabe |
| 5,379,721 A | 1/1995 | Dessing et al. |
| 5,457,773 A | 10/1995 | Jeon |
| 5,465,037 A | 11/1995 | Huissoon et al. |
| 5,479,078 A | 12/1995 | Karakarna et al. |
| 5,511,007 A | 4/1996 | Nihei et al. |
| 5,532,924 A | 7/1996 | Hara et al. |
| 5,570,458 A | 10/1996 | Umeno et al. |
| 5,572,102 A | 11/1996 | Goodfellow et al. |
| 5,600,760 A | 2/1997 | Pryor |
| 5,602,967 A | 2/1997 | Pryor |
| 5,608,847 A | 3/1997 | Pryor |
| 5,612,785 A | 3/1997 | Boillot et al. |
| 5,828,566 A | 10/1998 | Pryor |
| 5,906,761 A | 5/1999 | Gilliland et al. |
| 5,925,268 A | 7/1999 | Britnell |
| 5,956,417 A | 9/1999 | Pryor |
| 5,959,425 A | 9/1999 | Bieman et al. |
| 5,961,858 A | 10/1999 | Britnell |
| 6,035,695 A | 3/2000 | Kim |
| 6,044,170 A | 3/2000 | Migdal et al. |
| 6,049,059 A | 4/2000 | Kim |
| 6,084,203 A | 7/2000 | Bonigen |
| 6,163,946 A | 12/2000 | Pryor |
| 6,167,607 B1 | 1/2001 | Pryor |
| 6,304,050 B1 | 10/2001 | Skaar et al. |
| 6,430,474 B1 | 8/2002 | DiStasio et al. |
| 6,464,142 B1* | 10/2002 | Denenberg .............. B65G 1/137 235/462.46 |
| 7,130,718 B2 | 10/2006 | Gunnarsson et al. |
| 7,151,848 B1 | 12/2006 | Watanabe et al. |
| 7,734,358 B2 | 6/2010 | Watanabe et al. |
| 7,805,219 B2 | 9/2010 | Ishikawa et al. |
| 7,813,830 B2 | 10/2010 | Summers et al. |
| 7,818,091 B2 | 10/2010 | Kazi et al. |
| 7,946,439 B1 | 5/2011 | Toscano et al. |
| 8,494,678 B2 | 7/2013 | Quandt et al. |
| 8,525,070 B2 | 9/2013 | Tanaka et al. |
| 8,538,125 B2 | 9/2013 | Linnenkohl et al. |
| 8,644,984 B2 | 2/2014 | Nagatsnka et al. |
| 9,067,321 B2 | 6/2015 | Landsnes |
| 9,131,219 B2* | 9/2015 | Doucet .................... H04N 13/20 |
| 9,221,117 B2 | 12/2015 | Comardy et al. |
| 9,221,137 B2 | 12/2015 | Otts |
| 9,666,160 B2 | 5/2017 | Patel et al. |
| 9,685,099 B2 | 6/2017 | Boulware et al. |
| 9,773,429 B2 | 9/2017 | Boulware et al. |
| 9,821,415 B2 | 11/2017 | Rajagopalan et al. |
| 9,836,987 B2 | 12/2017 | Postlethwaite et al. |
| 9,937,577 B2 | 4/2018 | Daniel et al. |
| 9,975,196 B2 | 5/2018 | Zhang et al. |
| 9,977,242 B2 | 5/2018 | Patel et al. |
| 9,993,891 B2 | 6/2018 | Wiryadinata |
| 10,040,141 B2 | 8/2018 | Rajagopalan et al. |
| 10,083,627 B2 | 9/2018 | Daniel et al. |
| 10,191,470 B2 | 1/2019 | Inoue |
| 10,197,987 B2 | 2/2019 | Battles et al. |
| 10,198,962 B2 | 2/2019 | Postlethwaite et al. |
| 10,201,868 B2 | 2/2019 | Dunahoo et al. |
| 11,209,264 B2 | 12/2021 | Lonsberry et al. |
| 2003/0019931 A1 | 1/2003 | Tsikos et al. |
| 2004/0105519 A1 | 6/2004 | Yamada et al. |
| 2006/0047363 A1 | 3/2006 | Farrelly et al. |
| 2006/0049153 A1 | 3/2006 | Cahoon et al. |
| 2009/0075274 A1 | 3/2009 | Slepnev et al. |
| 2009/0139968 A1 | 6/2009 | Hesse et al. |
| 2010/0206938 A1 | 8/2010 | Quandt et al. |
| 2011/0297666 A1 | 12/2011 | Ihle et al. |
| 2012/0099798 A1 | 4/2012 | Saruta et al. |
| 2012/0154577 A1 | 6/2012 | Yoshikawa |
| 2012/0267349 A1 | 10/2012 | Bemdl et al. |
| 2013/0119040 A1 | 5/2013 | Suraba et al. |
| 2013/0132038 A1* | 5/2013 | Regan ...................... G06T 17/00 703/1 |
| 2013/0135450 A1 | 5/2013 | Pallone et al. |
| 2014/0088577 A1 | 3/2014 | Anastassiou et al. |
| 2014/0100694 A1 | 4/2014 | Rueckl et al. |
| 2014/0267619 A1 | 9/2014 | Bridges |
| 2015/0109418 A1* | 4/2015 | Lin ............................. G06T 7/80 348/47 |
| 2015/0362312 A1 | 12/2015 | Higo et al. |

(56) References Cited

U.S. PATENT DOCUMENTS

| | | |
|---|---|---|
| 2016/0096269 A1 | 4/2016 | Atohira et al. |
| 2016/0252392 A1 | 9/2016 | Tavassoly et al. |
| 2017/0132807 A1 | 5/2017 | Shivaram et al. |
| 2018/0117701 A1 | 5/2018 | Ge et al. |
| 2019/0108396 A1 | 4/2019 | Dal Mutto et al. |
| 2020/0041261 A1* | 2/2020 | Bernstein ................ A61B 1/07 |

OTHER PUBLICATIONS

International Search Report and Written Opinion issued in corresponding PCT Application No. PCT/US2023/068130, mailed Sep. 14, 2023.

Japanese Patent Application No. 2020-570446: Notice of Reasons for Rejection, dated Jun. 1, 2021, with English Translation, 11 total pages.

* cited by examiner

REFLECTION REFUTING LASER SCANNER

CROSS REFERENCE TO RELATED APPLICATIONS

This application is a continuation of U.S. patent application Ser. No. 17/547,763, entitled "Reflection Refuting Laser Scanner," filed Dec. 10, 2021, which is a continuation of U.S. patent application Ser. No. 16/778,649, entitled "Reflection Refuting Laser Scanner," filed Jan. 31, 2020, now U.S. Pat. No. 11,209,264, which is a continuation of U.S. patent application Ser. No. 16/397,428, entitled "Reflection Refuting Laser Scanner," filed Apr. 29, 2019, now U.S. Pat. No. 10,551,179, which claims priority to and the benefit of U.S. Provisional Application No. 62/664,320 entitled, "Reflection Refuting Laser Scanner," filed Apr. 30, 2018, the disclosure of each of which is incorporated herein by reference in its entirety.

TECHNICAL FIELD

Embodiments described herein generally relate to optical systems and methods for determining the shape and/or size of objects and rejecting reflections when imaging objects.

BACKGROUND

Laser scanners generally operate by projecting a laser line and capturing a reflection of the laser line. Laser triangulation, as shown in FIG. 1, is a technique that involves projecting a narrow laser line 125 from a light source 120 onto an object 110. The object 110 and/or the laser-line 125 is imaged by a camera 130. The laser-line 125 appears like a straight line when projected onto a flat surface. The system operates by visually observing the interaction between objects, surfaces, and/or environments, and the laser-line.

Known laser scanners are generally suitable for flat objects or objects having very low reflectivity. Known laser scanners are generally unsuitable for more complex, curved, and/or reflective objects. In particular, the laser line projected onto a curved reflective object is likely to cast multiple reflections, making it impossible or impractical to accurately scan the object. A need therefore exists for systems and methods of determining the shape and/or size of objects having complex and/or reflective surfaces.

SUMMARY

Some embodiments described herein relate to optical systems and methods for determining the shape and/or size of objects that include projecting a pattern of light onto the object. The pattern of light can be configured such that first-order reflections can be distinguished from second- and/or higher-order reflections, which can be rejected. Thus, even in instances in which the pattern of light is reflected onto the object multiple times, the original, or first-order, reflection can be detected, distinguished, and/or used for laser triangulation. In some embodiments, a pattern of light that does not have reflection and/or rotational symmetry is projected onto the object, such that second-order and/or higher-order reflections can be distinguished from the first-order reflection.

DETAILED DESCRIPTION

Figure 1:
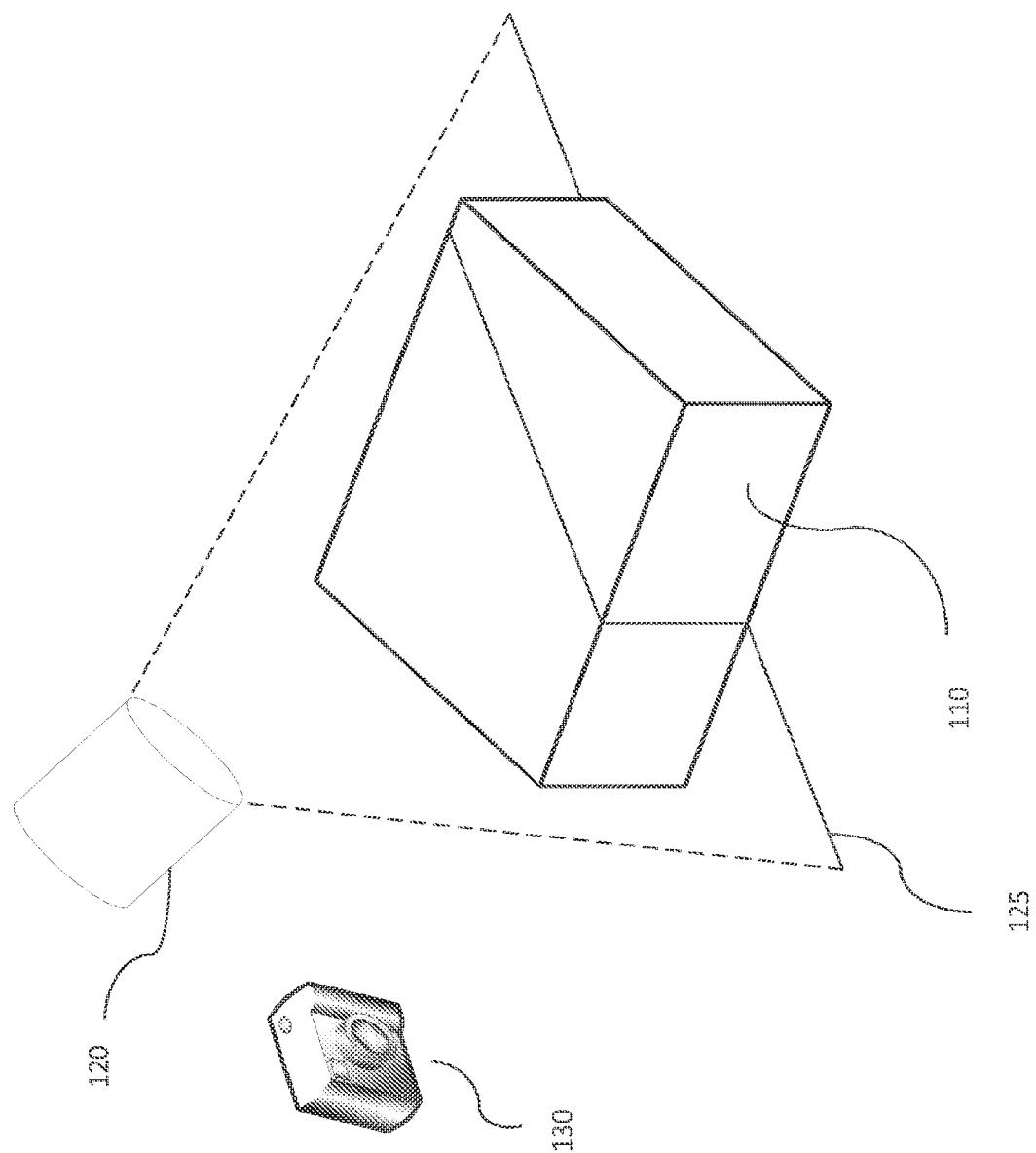
FIG. 1 is a schematic illustration of a prior art laser-triangulation system.

Embodiments described herein relate to optical systems and methods for determining the shape and/or size of objects that include projecting a pattern of light onto the object. The pattern of light can be configured such that first-order reflections can be distinguished from second- and/or higher-order reflections, which can be rejected. Thus, even in instances in which the pattern of light is reflected onto the object multiple times, the original, or first-order, reflection can be detected, distinguished, and/or used for laser triangulation. As described in further detail below, in some embodiments, the pattern of light projected onto the object does not have reflection and/or rotational symmetry, such that second-order and/or higher-order reflections can be distinguished from the first-order reflection. Laser triangulation techniques can be applied to images captured of the object that include first-order reflections (e.g., images from which second- and/or higher-order reflections have been removed) to create a model of at least a portion of the object.

The term laser triangulation is used herein to refer to techniques used to determine the shape of an object onto which a pattern is projected. It should be understood that the light projected onto the object need not originate from a laser source. Additionally, the term laser triangulation should not be understood to mean that the pattern requires a thin straight linear portion. Laser triangulation techniques can be used to ascertain the shape of an object using any predetermined pattern originating from any suitable light source. Similarly stated, laser triangulation can include analyzing an image of a part illuminated by any predetermined pattern to identify deviations in the pattern caused by the shape of the part onto which the pattern is projected.

Some embodiments described herein relate to apparatus and/or systems that include a light source, a detector, and a compute device. The light source can be configured to project a pattern onto a part such that a first-order reflection of the pattern is distinct from a second order— (and/or other greater-than-first-order reflections of the pattern.) A detector can be configured to capture an image of the part, for example while the part is illuminated by the light source. The compute device can be communicatively coupled to the detector and configured to process the image of the part to identify a first-order reflection of the pattern and/or to filter second-order reflection (and/or higher-order reflections) from the image.

Some embodiments described herein relate to a method that includes projecting a predetermined non-symmetric pattern onto a part. An image of the part can be captured, for example, by a camera or other detector device. The image of the part can be processed to remove a second-order reflection of the non-symmetric pattern. A shape of a portion of the part can be determined based on deviations from the predetermined non-symmetric pattern in the first-order reflection of the non-symmetric pattern in the image of the part.

Some embodiments described herein relate to a computer-implemented method that includes receiving multiple images of a part that is illuminated by a pattern that has a predetermined geometry, at least one of the images including a second-order reflection of the pattern. The second-order reflection can be filtered or rejected by comparing a geometry of the second-order reflection to the predetermined geometry. A three-dimensional model of at least a portion of the part can be generated by on triangulating a portion (e.g., a linear portion) of the pattern in first-order reflections captured in the plurality of images.

Figure 2:
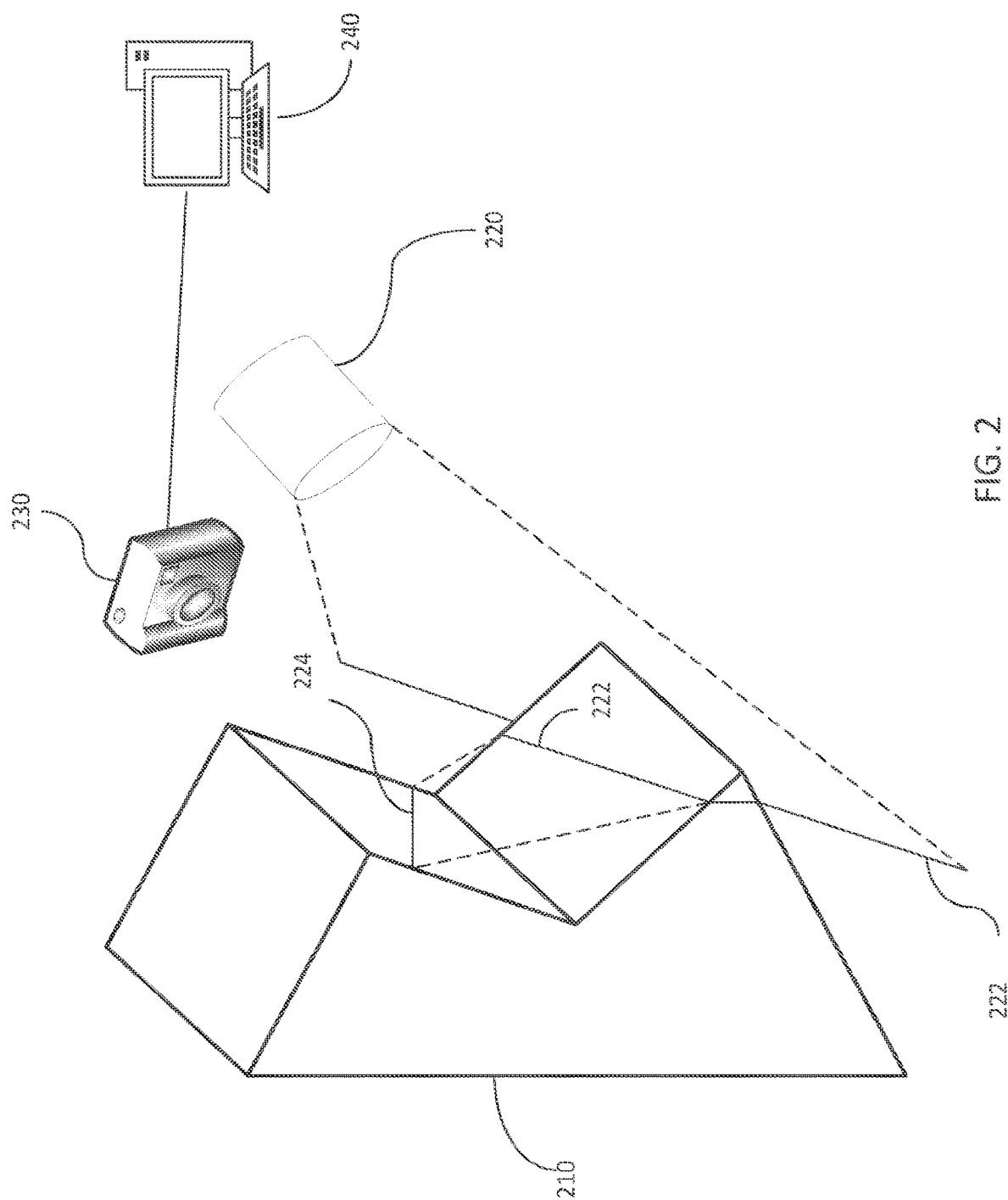
FIG. 2 is a schematic illustration of a system configured to detect a geometry of a part, according to an embodiment.

FIG. 2 is a schematic illustration of a system configured to detect a geometry of part 210, according to an embodiment. A light source 220 is configured to project a predetermined pattern onto the part 210. Suitable patterns are described in further detail below, but in general, the pattern is two-dimensional and includes a linear portion. The light source 220 can be any suitable light source configured to project a pattern. For example, the light source 220 can be a Berlin Lasers, 532 nm Glass Lens Green Laser-line Generator. As another example, the light source 220 can be an LED structured light pattern projector, such as those produced by Smart Vision Lights. As yet another example, the light source can be a Digital Light Processing (DLP), Liquid Crystal on Silicon (LCoS), Liquid-Crystal Display (LCD) or any other suitable projector, such as the type typically used to project visual media in a home or professional theatre.

The light source 220 can be configured to project a predetermined pattern in any suitable wavelength and/or combination of wavelengths. In some embodiments, the light source 220 can be configured to project at least a portion of a pattern in a wavelength that has good contrast against the part 210. For example, in instances in which the part 210 is blue, at least a portion of the pattern could be yellow. In instances in which the part 210 is red, at least a portion of the pattern could be red.

A detector 230 is configured to image the part 210 while the part 210 is being illuminated by the light source 220. The detector 230 can be any suitable camera or photodetector. The detector 230 is sensitive to the wavelengths of light emitted by the light source 220. The detector 230 can have a resolution sufficient to capture salient features of the pattern projected by the light source 220. For example, the detector 230 can be Basler ace acA2040-180kc with a desired lens attached. An example of a suitable lens is the Edmund Optics 8 mm/F1.8 C-mount.

The light source 220 and the detector 230 can be preconfigured, communicatively coupled, or otherwise coordinated such that the light source 220 is configured to project the pattern in a suitable wavelength with a suitable intensity such that the part 210 reflects the pattern with sufficient intensity in a color-band to which the detector 230 is sensitive. In embodiments in which different regions of the part have different colors or reflective characteristics, the detector 230 can be operable to project different patterns, patterns having different colors, and/or patterns with different intensities based on the reflective characteristics of the portion of the part 210 being illuminated and/or the sensitivity of the detector 230.

As described above with reference to FIG. 1, laser triangulation systems are generally suitable for determining the geometry of simple, non-reflective parts. Objects, such as part 210 that have reflective and/or angled surfaces may produce second-order or higher reflections that known systems may not be able to resolve. As shown in FIG. 2, the light source 220 projects the pattern onto the part 210, creating a first-order reflection 222, which the detector 220 can capture. The pattern can reflect off the part 210 and cast a second-order reflection 224 on another portion of the part 210, which the detector 220 can also capture. A compute device 240 (having a processor and a memory) can distinguish the first-order reflection 222 from the second-order reflection 224 (and, in some instances, higher-order reflections), and refute or filter the second- and/or higher-order reflections such that only the first-order reflection 222 is used to determine the shape of the part 210.

In some embodiments, a shape and/or size of the part 210 can be determined by analyzing the images of the part 210 taken by the detector while the part is illuminated by the light source 220. Specifically, the light source 220 can project a predetermined pattern onto the part 210, and one or more images of the part 210 illuminated by the pattern can be captured by the detector and processed by the compute device 240. The compute device 240 can analyze deviations between the first-order reflection of the pattern and the expected predetermined pattern. Deviations can be attributed to the shape and/or size of the part 210 onto which the pattern is projected. In some instances, the compute device 240 can store or determine (e.g., through a calibration routine) information about the detector 230, which may include, but is not limited to, its position and orientation in space and/or information about the light source 220, which may include, but is not limited to, its position and orientation in space. Information about the detector 230 and/or the light source 220 can be used to produce the three-dimensional position (x, y, z states within some reference frame) of the points or regions where the pattern and part 210 intersect. Similarly stated, three-dimensional coordinates for portions of the part 210 illuminated by the pattern can be determined. Any desired technique and method to produce the data may be used with the disclosed system.

Figure 3:
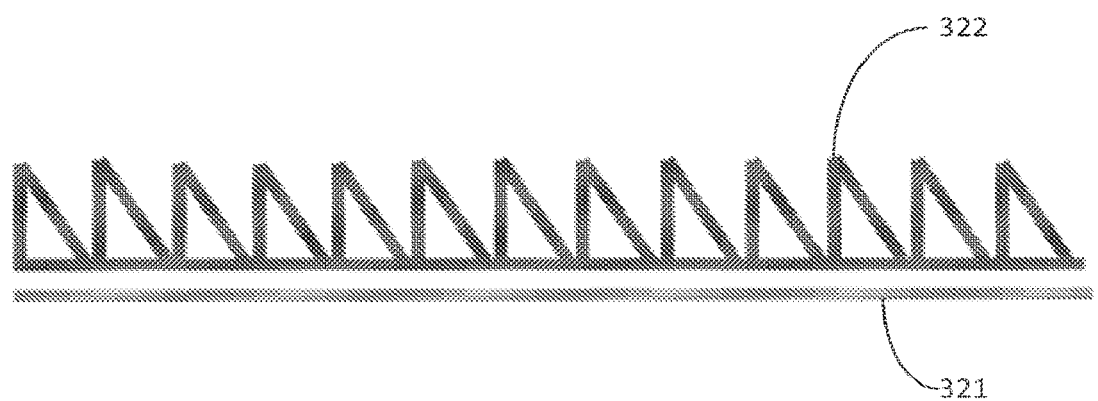
FIG. 3 is an illustration of an example pattern that can be projected by a light source that can be used to distinguish first-order reflections from second-order reflections, according to an embodiment.
Figure 4:
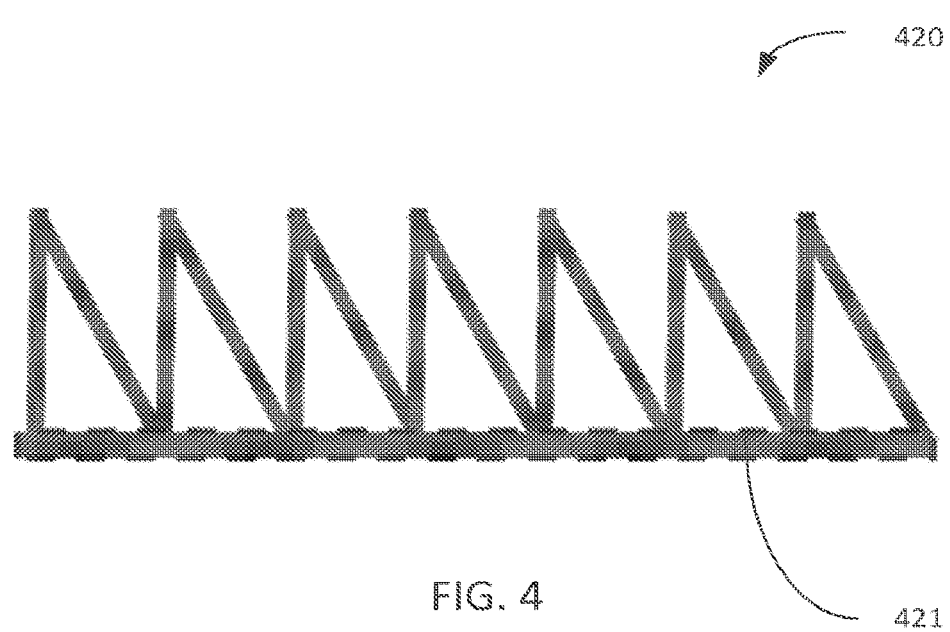
FIG. 4 is an illustration of an example pattern that can be projected by a light source that can be used to distinguish first-order reflections from second-order reflections, according to an embodiment.

FIG. 3 and FIG. 4 are illustrations of example patterns that can be projected by a light source that can be used to distinguish first-order reflections from second-order reflections, according to two embodiments. In particular, the patterns shown in FIGS. 3 and 4 do not have reflection or rotational symmetry. Thus, a second-order reflection of the patterns shown in FIGS. 3 and 4 can be distinguished from a first-order reflection. Similarly stated, the patterns shown in FIGS. 3 and 4, under any rotation or combination of rotations will never be identical or equivalent to the original (predetermined) pattern after a reflection followed by any rotation or combination of rotations. Rotation of a pattern in a mathematical sense, as applied to a two-dimensional pattern on some plane in Euclidean space, is a mapping from the Euclidean space to itself, where the shape or points are rotated about a single point on the plane and where the shape is preserved. Reflection of a pattern in a mathematical sense, as applied to a two-dimensional pattern on some plane in Euclidean space, is a mapping from the Euclidean space to itself, where the points or shapes that are reflected are mirrored about an axis on the plane.

The pattern of FIG. 3 includes two distinct portions, a linear portion 321 and a pattern portion 322. The linear portion 321 has a predefined orientation and position relative to the pattern portion 322. In some embodiments, the linear portion 321 and the pattern portion 322 can be different colors. For example, the linear portion 321 can be a green laser line and the pattern portion 322 can be red. It should be understood that the linear portion 321 and the pattern portion 322 can be any wavelength (e.g., any "color,"

including wavelengths not visible to the human eye) or combination of wavelengths. Furthermore, it should be understood that the linear portion 321 and the pattern portion 322 can be generated separately or together (e.g., from a single light source or using multiple light sources).

In some embodiments, the linear portion 321 can be used for laser triangulation to determine the shape of a part, while the pattern portion 322 can be used to determine whether a reflection is a first-order reflection (used to determine the shape of a part) or a second- or higher-order reflection, which can be filtered or refuted. In embodiments in which the linear portion 321 and the pattern portion 322 are different colors, the pattern portion 322 can be filtered from an image after any reflections are refuted, which can provide a simpler image for laser triangulation processing.

Unlike the pattern of FIG. 3, the pattern of FIG. 4 does not have a distinct linear portion and pattern portion. Portion 421 of pattern 420 is linear, can be detected and/or isolated from images of the pattern 420 by a compute device, and used to conduct laser triangulation analysis of a part. In yet other embodiments, the pattern may not include a single or continuous line.

As described herein, any suitable pattern can be used, provided the detector and/or the compute devise can distinguish between first-order reflections and second-order reflections (and, in some instances, higher-order reflections). In some embodiments, the patterns do not have reflection or rotational symmetry. Similarly stated, patterns of any size, shape, and configuration can be used and may be selected based on the application, classification technique, type of light source available, and/or any other factor. In some embodiments, multiple patterns can be projected onto a part. In some embodiments, a pattern can include multiple linear portions such that multiple "laser lines" or laser line analogs can illuminate a part simultaneously. In embodiments in which multiple patterns and/or patterns having multiple linear portions illuminate a part, each pattern can be similar or each pattern can be different. Using different patterns and/or colors can be helpful to distinguish patterns, and hence originating light source, from each other in multiple pattern embodiments. Furthermore, in some embodiments, multiple patterns can be used in coordination, concurrently and/or sequentially, which can improve visibility on some surfaces or objects. Similarly stated, some patterns, colors, etc. may be more visible on certain surfaces than others.

FIGS. 3 and 4 depict patterns having a portion that includes non-isosceles right triangles, but it should be understood that any suitable pattern can be used. Similarly stated, laser triangulation can be used to ascertain a shape of a part using any pre-determined pattern. Such patterns may not include a continuous linear portion and/or may contain curves and/or arcs used for laser triangulation. Such patterns will typically not have reflection or rotational symmetry. Such patterns may overlap a linear (or curved) portion that is used for laser triangulation. Multiple patterns can be used, with no limitation on the number and type(s) of patterns implemented. The pattern may or may not fully encompass the entirety of the linear (or curved) portion used for laser triangulation.

Figure 5:
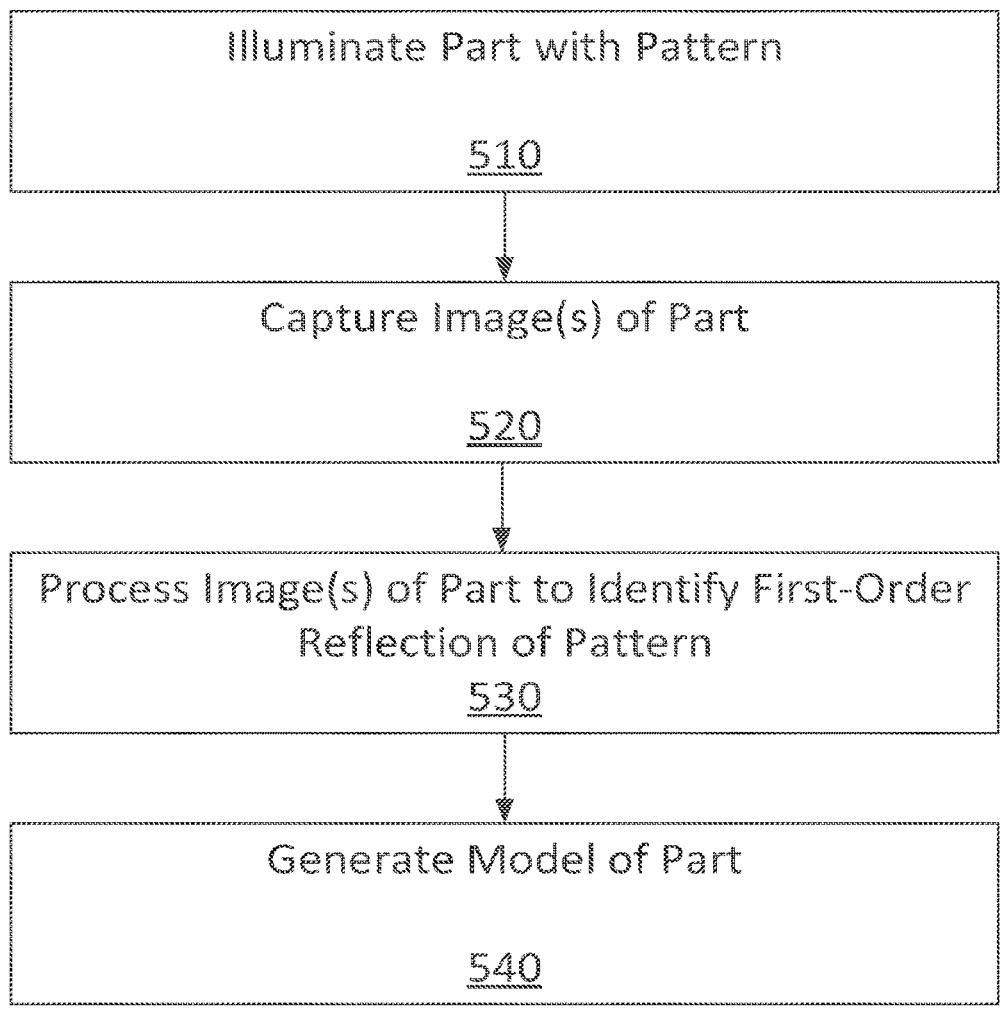
FIG. 5 is a flow chart of a method for determining a geometry of at least a portion of a part, according to an embodiment.

FIG. 5 is a flow chart of a method for determining a geometry of at least a portion of a part, according to an embodiment. At 510, a part can be illuminated with a pattern. As described above, the pattern typically does not have reflection or rotational symmetry. Additionally, the pattern typically includes a linear portion, either as part of the pattern itself (e.g., as shown in FIG. 4) or associated with the pattern (e.g., as shown in FIG. 3). In some embodiments, the pattern can be moved or "scanned" over the part, such that each portion of a surface of the part is illuminated by the pattern. In some embodiments, the part can be moved or rotated such additional surfaces of the part can be illuminated by the pattern. In some embodiments, multiple light sources disposed in different locations can illuminate the part from multiple angles such that multiple surfaces of the part can be illuminated.

At 520, one or more images of the part can be captured by one or more detectors. In embodiments in which a pattern(s) in scanned across a surface(s) of the part, detector(s) can capture a series of images or video of the part, where the pattern is projected onto a different portion of the part in each image.

At 530, a compute device operatively coupled to the detector(s) (having a processor and a memory) can process the image(s) to identify a first-order reflection of the pattern and filter or refute second- and/or higher-order reflections. For example, as described above, the pattern can be configured such that a second-order reflection (and/or higher-order reflections) are distinguishable from first-order reflections and the compute device can be operable to reject such higher-order reflections.

Processing images to distinguish between first-order reflections and higher-order reflections includes pattern recognition and/or classification. In some embodiments, pattern recognition can include classifying a patterns detected in an image as first-order reflections (class 0) or as not-first-order reflections (class 1). Any suitable combination of software and hardware can be a classifier operable to identify a pattern as a class 0 reflection or a class 1 reflection. For example, an image of the part can be analyzed (e.g., by a processor) to identify pixels that match the color of at least a portion of the pattern projected by a light source (optionally accounting for color shifts caused by non-white surfaces and/or non-ideal mirrors). The pattern of pixels that match the color of at least a portion of the pattern can be compared to an expected pattern of a first-order reflection of the projected pattern. If the pattern of pixels matches the expected pattern of a first-order reflection, laser triangulation techniques can be applied to a portion of those pixels and/or pixels associated those pixels. If the pattern of pixels does not match the expected pattern (e.g., the pattern of pixels is a "mirror image" of the expected pattern), those pixels and/or other pixels associated with those pixels can be identified as being associated with a second- or higher-order reflection and may be filtered or discarded before laser triangulation techniques are applied to the image.

In some embodiments, a pattern projected onto a part may be reflected more than two times and yet may appear to be a first-order reflection. For example, a third-order or other higher-order reflection may, under certain circumstances, appear similar to a first-order reflection. In some embodiments odd-numbered non-first-order reflections can be identified as class 1 reflections by analyzing intensity, noise, and/or clarity of the pattern. For real-world surfaces (i.e., not ideal mirrors), each reflection induces a degree of scattering due to surface imperfections, absorbance, and the like. Accordingly, patterns having noise above a predetermined or dynamic threshold, intensity below a predetermined or dynamic threshold, and/or clarity below a predetermined or dynamic threshold can be identified as class 1 reflections and rejected.

In some embodiments, a convolutional neural network (CNN) which also may be called deep convolutional neural network or simply convolutional network, can be used as the classifier to recognize a pattern or any part thereof. Any suitable CNN, having any suitable number of layers, activation function of the neurons, connection between layers, network structure, and/or the like may be used to classify patterns detected in images. In some embodiments, the network structure of a CNN may be tuned and/or altered through training using any suitable means. A CNN may be initialized using any suitable means. In addition or alternatively, techniques like Scale Invariant Feature Transform (SIFT), or other types of neural networks could be used as a classifier to identify a pattern.

In some embodiments, the classifier can localize and/or be implemented in a way to operate on regions, sub-elements, or sub-images within one or more images captured by the detector. In some embodiments, the classifier can be applied such that individual pixels (or regions indexed in some other fashion), acquired by the detector(s), can be classified.

As an example, a classifier can operate by, for each pixel in the image, creating a sub-image. Each sub-image can have an odd number of (pixel) rows and an odd number of (pixel) columns centered on a particular pixel. The size of each sub-image (e.g., the number or rows and columns) can be selected based on the pattern and configured such that a salient feature of the pattern (e.g., at least one entire triangle of the patterns shown in FIGS. 3 and/or 4) will be contained in the sub-image when the linear portion of the pattern is centered in the sub-image. The classifier can determine whether the center pixel is constituent to a linear portion of a pattern and whether the pattern is a first-order reflection or a greater-than-first-order reflection. The classifier can denote the sub-image as class 0 if the center pixel is constituent to a linear portion of a pattern and the pattern is a first-order reflection. The classifier can denote the sub-image as class 1 if the center pixel is not constituent to a linear portion of a pattern and/or the pattern is not a first-order reflection. The classifier can iterate the various sub-images and save the classification result in memory. It should be understood, however, that other classifiers may be operable to classify more than one pixel at a time in an image or sub-image, that the location of the pixel or pixels used to classify an image and/or sub-image need not be the central pixel, and/or the image and/or sub-image may be filtered, normalized, or otherwise processed by the classifier or before the image is received by the classifier.

At 540, a model of at least a portion of the part can be generated by the compute device, using only first-order reflections (class 0) of the pattern. Similarly stated, laser triangulation can be performed on first-order reflections of the pattern using, for example, known positions of the detector(s) and/or light source(s). In other words, deviations in a first-order reflection of a linear or other portion of the pattern having a predetermined shape can be used to identify the shape of the portion of the part illuminated by that portion of the pattern. That is, portions of the pattern that are known to be linear (or having another pre-determined shape) may appear non-linear (or have a shape different from the pre-determined shape) in the first-order reflection due to being projected onto and reflected from a non-planar surface. By analyzing first order reflections of the pattern, such deviations can be used to map the surface of the part onto which the pattern is projected.

In embodiments in which the pattern(s) is scanned across a surface of the part, a three-dimensional model of the surface can be generated using the multiple images that were processed at 530 to remove second- and/or higher-order reflections. Similarly stated, each image can capture a different portion of the part illuminated by a first order reflection of a linear or other portion of the pattern having a predetermined shape and deviations in that portion of the pattern can be used to generate a three-dimensional model of the surface of the part.

Embodiments described herein can be particularly suitable for completely or semi-autonomous manufacturing processes, such as robotic welding. For example, in some embodiments, a light source and/or detector can be coupled to a suitable robot (e.g., a six-axis welding robot). Models of parts described herein can be used to identify joints for welding or other features for automated machining processes. Many welding processes involve the joining of highly reflective materials, such as aluminum and stainless steel. Such materials often are also frequently curved and cast multiple reflections, which may render traditional laser-triangulation methods unsuitable.

While various embodiments have been described above, it should be understood that they have been presented by way of example only, and not limitation. For example, some embodiments described herein reference a single light source, a single detector, and/or a single pattern. It should be understood, however, that multiple light sources can illuminate a part. Each light source can illuminate the part with a similar pattern, or different patterns. Patterns can be detected by multiple detectors. In embodiments with multiple light sources, it may be advantageous for each light source to illuminate the part with a different pattern such that detector(s) and/or compute devices processing images captured by detectors can identify which light source projected which pattern.

Furthermore, although various embodiments have been described as having particular features and/or combinations of components, other embodiments are possible having a combination of any features and/or components from any of embodiments where appropriate as well as additional features and/or components. For example, although not described in detail above, in some embodiments, methods of determining a shape of a portion of a part may include a calibration phase during which distortion of the detector(s), the lens(es) on said detector(s), the distortion in the combination of detector(s) and lens(es), and/or the relative position of the camera(s) to a test surface or fixture onto which a pattern(s) is projected are determined.

Some embodiments described herein relate to methods and/or processing events. It should be understood that such methods and/or processing events can be computer-implemented. That is, where method or other events are described herein, it should be understood that they may be performed by a compute device having a processor and a memory such as the compute device 240. Methods described herein can be performed locally, for example, at a compute device physically co-located with a detector, light emitter, and/or part, and/or remotely, e.g., on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Where methods described above indicate certain events occurring in certain order, the ordering of certain events may be modified. Additionally, certain of the events may be performed concurrently in a parallel process when possible, as well as performed sequentially as described above. Although various embodiments have been described as having particular features and/or combinations of components, other embodiments are possible having a combination of any features and/or components from any of the embodiments where appropriate.

What is claimed is:

1. A method comprising:
   receiving, via a detection device, an image of an object illuminated by a light source configured to project a light pattern, the object causing first-order reflections and higher-order reflections of the projected light pattern, wherein the image includes the first-order reflections and the higher-order reflections, and wherein the projected light pattern enables identification of the first-order reflections in the image;
   performing a comparison based on at least one first-order reflection of the first-order reflections and a geometric attribute of the projected light pattern;
   identifying one or more deviations in the first-order reflections based on the comparison; and
   generating a model of at least a portion of the object based on identification of the one or more deviations.

2. The method of claim 1, wherein the projected light pattern lacks reflection symmetry.

3. The method of claim 1, wherein the projected light pattern includes a linear portion and a non-symmetric portion.

4. The method of claim 3, wherein the geometric attribute of the projected light pattern includes the linear portion or the non-symmetric portion.

5. The method of claim 1, wherein the geometric attribute includes a linear portion of the projected light pattern or a non-symmetric portion of the projected light pattern.

6. The method of claim 1, further comprising identifying a shape of at least the portion of the object based on the one or more deviations.

7. The method of claim 1, wherein the light source includes a laser light source, and the projected light pattern includes multiple laser lines.

8. The method of claim 1, wherein performing the comparison includes comparing the at least one first-order reflection to the geometric attribute of the projected light pattern.

9. A system, comprising:
   a detection device configured to capture an image of an object during illumination of the object with a light pattern projected by a light source, the image includes reflections of the projected light pattern caused by the object; and
   a processor communicatively coupled to the detection device, the processor configured to:
      receive, from the detection device, image data associated with the image;
      perform a comparison based on a first-order reflection of the reflections and a characteristic of the projected light pattern;
      identify, based on a result of the comparison, at least one deviation associated with the first-order reflection; and
      generate a model of at least a portion of the object based on the identified deviation.

10. The system of claim 9, further comprising the light source, wherein the light pattern lacks reflection symmetry.

11. The system of claim 9, wherein:
    the reflections include:
       first-order reflections; and
       higher-order reflections of the projected light pattern; and
    the higher-order reflections include:
       a second-order reflection,
       another reflection that has an order greater than the second-order reflection, or
       a combination thereof.

12. The system of claim 9, wherein the processor is further configured to:
    identify the first-order reflection based on the image data;
    to perform the comparison based on multiple first-order reflections of the reflections; or
    a combination thereof.

13. The system of claim 9, wherein, to perform the comparison, the processor is configured to compare the first-order reflection to the characteristic.

14. The system of claim 9, wherein the projected light pattern includes a linear portion, a non-symmetric portion, or a combination thereof.

15. The system of claim 9, wherein the processor is further configured to identify a shape of at least the portion of the object based on the deviation.

16. The system of claim 15, wherein the model is generated based on the identified shape, the model includes a three-dimensional model, or a combination thereof.

17. A non-transitory processor-readable medium storing code configured to be executed by a processor, the code comprising code to cause the processor to:
    receive, from a detection device, image data associated with an image the image including captured by the detection device, the image includes an object illuminated with a light pattern projected by a light source, and wherein the image includes reflections of the projected light pattern caused by the object;
    perform a comparison based on a first-order reflection of the reflections and a characteristic of the projected light pattern;

identify, based on a result of the comparison, at least one deviation associated with the first-order reflection; and
generate a model of at least a portion of the object based on the identified deviation.

18. The non-transitory processor-readable medium of claim 17, wherein the projected light pattern is configured to enable identification of one or more first-order reflections in the image, the one or more first-order reflections including the first-order reflection.

19. The non-transitory processor-readable medium of claim 17, wherein the characteristic of the projected light pattern includes a geometric attribute of the projected light pattern.

20. The non-transitory processor-readable medium of claim 19, wherein the geometric attribute includes a linear portion of the projected light pattern or a non-symmetric portion of the projected light pattern.

\* \* \* \* \*